United States Patent Office 2,836,557
Patented May 27, 1958

2,836,557
METHOD OF INHIBITING CORROSION OF METALS

William B. Hughes, Tulsa, Okla., assignor to Cities Service Research and Development Company, New York, N. Y., a corporation of New Jersey No Drawing. Application May 17, 1954
Serial No. 430,448

6 Claims. (Cl. 252—8.55)

This invention relates to inhibiting corrosion of metals and is more particularly concerned with improved compositions and processes for treating natural oil-brine mixtures to reduce their corrosive action upon production, transmission, and other oil field equipment.

It is a well-known fact that many oil producing formations yield with the crude oil a brine which is extremely corrosive in its action upon metal tubing, casings, pumps and other oil producing and collection equipment; and that this type of corrosion is particularly noticeable in wells producing brines containing dissolved hydrogen sulfide, carbon dioxide or other acidic materials. In the past, efforts have been made to reduce the cost of maintaining production and collection equipment by introducing into the well caustic soda or other alkaline solutions in such proportion as to neutralize the acidic components, or by the use of certain water-soluble corrosion inhibiting agents such as formaldehyde, bone oil, nitrogen bases of various types, amines, and combinations of these reagents. While these corrosion inhibitors are satisfactory at a number of locations when used in wells which produce little water as compared to the oil produced, their cost becomes prohibitive when used in wells producing large amounts of water, since the same concentration of the inhibitor must be maintained in the water phase in both types of wells in order to satisfactorily prevent corrosion of the equipment.

It is an object of this invention to provide oil-soluble compositions which may be economically employed in preventing corrosion in wells producing oil-brine mixtures, and especially in those producing large amounts of brine as compared to oil.

In my U. S. Patent 2,646,399 I disclosed that the products obtained by reacting, according to the method of Riebsomer (J. Org. Chem. 15, 241, 1950) two mols of a polyethylene amine such as diethylene triamine, triethylene tetramine, or tetraethylene pentamine, with one mol of a dibasic acid having 8 or more carbon atoms, are very effective in lowering the corrosive action of oil and brines. I have now discovered that if the products so prepared are reacted further with one or two mols of an aldehyde so as to introduce into the structure one or more imidazolidine or imine group, dicarboxylic acids having less than 8 carbon atoms, such as succinic acid, may also be successfully used, the resultant compounds show surprisingly greater effectiveness in combatting corrosion, and afford substantial protection when present in the oil-brine mixture in amounts as low as five parts per million.

My new corrosion inhibitor compositions fall into the class of substituted bis-imidazolines having the generic formula

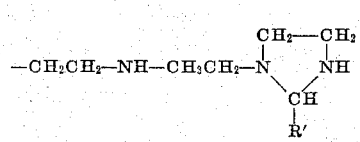

in which Y is a hydrocarbon radical having more than 1 carbon atom, one R is (1)                —CH$_2$CH$_2$—NH$_2$
(2)        —CH$_2$CH$_2$NH—CH$_2$CH$_2$—NH$_2$
(3)  —CH$_2$CH$_2$—NH—CH$_2$CH$_2$—NH—CH$_2$CH$_2$—NH$_2$
(4)              —CH$_2$CH$_2$—N=CHR'
(5)

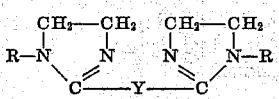

or (6)

in which R' may be hydrogen or a hydrocarbon radical, and the other R is (4), (5), or (6).

The exact form which each R would take would depend on the polyethylene amine employed, and the number of mols of aldehyde reacted with the primary reaction product. Thus, if the amine used were triethylene tetramine, and the intermediate acid-amine reaction product were reacted with one mol of an aldehyde, one R would be (2) and the other R would be (5); if two mols of an aldehyde were used, both R's would be (5).

Similarly, if the amine were diethylene triamine, and one mol of an aldehyde were used, one R would be (1), and the other would be (4); two mols of an aldehyde would yield a product in which both R's were (4). If instead of using two mols of the same amine, a mixture of amines are used, structures having both an imine and an imidazolidine group may be obtained. For example, if one mol of diethylene triamine and one mol of tetraethylene pentamine were reacted with one mol of a dibasic acid, and this intermediate product reacted with two mols of an aldehyde, a mixture of products would result, in some of which both R's would be (6), in some of which both R's would be (4), and in some of which one R would be (4) and the other would be (6).

The aldehyde employed would determine the structure of R'. For example, if formaldehyde were used, R' would be a hydrogen atom, if acetaldehyde were used, R' would be —CH$_3$, and for higher aldehydes R' would be a higher molecular weight hydrocarbon radical of one less carbon atom than the aldehyde used.

As an example of the method by which my compositions may be prepared the following example is given, it being understood, however, that the exact conditions given in the example are not in any way critical.

EXAMPLE

To a mixture of 30 grams (0.1 mol) of dimerized linoleic acid prepared according to the directions given in Journal of American Oil Chemists Society, 24, 65 (March 1947) and hereafter referred to as dimer acid, and 29.2 grams (0.2 mol) of diethylenetriamine, 50 ml. of benzene was added. The mixture was heated under a water-trap condenser in order to distill the water-benzene azeotrope mixture, with the benzene being returned continuously through the decanter still head to the reaction mixture. After a four-hour reaction period, 6.8 grams of water had been collected, which was almost the theoretical quantity which would be split out by the reaction of the amine with both carboxyl groups of the dimerized acid to produce the bis-imidazoline. Six grams, or 0.2 mol of formaldehyde were then added, and refluxing was continued until sufficient water had been split out to indicate that the desired di-imine had been formed, after which the remaining benzene was distilled off.

In order to test the effectiveness of my new compounds in combatting corrosion, the following procedure was adopted. To a one liter Erlenmeyer flask 600 ml. of a 5% aqueous sodium chloride solution and 400 ml. of depolarized kerosene was added. A steel strip was then suspended in the liquid by means of a glass hook through a rubber stopper in such a manner that half of the strip was in contact with the kerosene, and the other half in contact with the aqueous layer. The stopper was also equipped with a gas inlet and outlet line. Natural gas or nitrogen was then blown through the liquid for about one hour, in order to purge any oxygen present, and the inhibitor was added. Hydrogen sulfide was then blown through the liquid until it was saturated, and the flask was then sealed and allowed to stand 48 hours. The steel strip was then removed, cleaned, and weighed to determine the weight loss due to corrosion. In all cases duplicate tests were run to determine the weight loss of strips subjected to the action of uninhibited liquids, and thus determine the effectiveness of the corrosion inhibitor.

The results of these test calculations are summarized in the following tables in which TETA is triethylene tetramine, DETA is diethylene triamine, and TEPA is tetraethylene pentamine. The first three columns indicate the reactants used, the fourth the molar proportions in which they were reacted, and the remaining columns the percent corrosion at various concentrations of inhibitor in the oil-brine mixture. Blanks indicate that the compositions were not tested at these concentrations. "Percentage corrosion" in all instances is the weight loss of the strip exposed to the inhibited liquid divided by the weight loss of a strip exposed to uninhibited liquid under the same conditions.

*Table I*

BIS-IMIDAZOLINE—IMIDAZOLIDINE AND DI-IMIDAZOLIDINES

| | | | | 5 | 6 | 7 |
|---|---|---|---|---|---|---|
| 1 | 2 | 3 | 4 | Percent corrosion | | |
| | | | | 25 p.p.m. | 10 p.p.m. | 5 p.p.m. |
| TEPA | Dimer acid | None | 2:1 | 5.7 | 42.7 | |
| TEPA | do | HCHO | 2:1:2 | 1.1 | 4.1 | 17.5 |
| TEPA | do | do | 2:1:1 | 8.7 | 13.8 | |
| TEPA | do | Heptaldehyde | 2:1:2 | 5.8 | 10.1 | 22.2 |
| TEPA | do | Benzaldehyde | 2:1:2 | 8.9 | 6.4 | 18.1 |
| TEPA | do | do | 2:1:1 | 1.2 | 2.4 | 50.0 |
| TETA | Dimer acid | HCHO | 2:1:2 | 5.0 | 10.1 | |
| TETA | Dimer acid | Heptaldehyde | 2:1:2 | 0.9 | 9.2 | 25.7 |
| TETA | Dimer acid | Benzaldehyde | 2:1:1 | 5.4 | 5.2 | 27.1 |
| TETA | Succinic acid | Heptaldehyde | 2:1:2 | 0.9 | 3.7 | 9.5 |
| TETA | do | Benzaldehyde | 2:1:2 | 1.6 | 18.3 | 37.9 |

*Table II*

BIS-IMIDAZOLINE—IMINE AND DIIMINES

| | | | | 5 | 6 | 7 |
|---|---|---|---|---|---|---|
| 1 | 2 | 3 | 4 | Percent corrosion | | |
| | | | | 25 p.p.m. | 10 p.p.m. | 5 p.p.m. |
| DETA | Dimer acid | None | 2:1 | 23.9 | | |
| DETA | do | HCHO | 2:1:2 | 5.3 | 9.3 | |
| DETA | do | Heptaldehyde | 2:1:1 | 6.6 | 32.6 | |
| DETA | Succinic Acid | None | 2:1 | 10.8 | 29.5 | |
| DETA | do | HCHO | 2:1:2 | 0.9 | 12.6 | 38.5 |
| DETA | do | Heptaldehyde | 2:1:2 | 1.1 | 16.7 | 46.5 |
| DETA | do | Benzaldehyde | 2:1:2 | 5.5 | 23.5 | |

It will be evident from the foregoing that the aldehyde-modified reaction products of the present invention are far more efficient as corrosion inhibitors in low concentrations than the amine-acid products made according to U. S. Patent 2,646,399. The reason for this is not known, since it would be expected that a free amino group would attach itself with greater vigor to a metal surface to provide a protective film. It may be, however, that true chemisorption is a rather slow process, and that when a chemical is rapidly adsorbed, layers are built up which are loosely bound and easily penetrated and removed by the physical action of liquids moving in the system.

In using my improved compositions for protecting oil well tubing, casing, and other equipment which comes in contact with the corrosive oil-brine production, it has been found that excellent results may be obtained by injecting an appropriate quantity of a selected composition into a producing well so that it may mingle with the oil-brine mixture and come into contact with the casing, tubing, pumps, and other producing equipment. I may, for example, introduce the inhibiting composition into the top of the casing, thus causing it to flow down into the well and thence back through the tubing, etc. In general, I have found that this procedure suffices to inhibit corrosion throughout the entire system of production and collection, even including field tankage.

It is to be understood that the improved compositions of my invention are not limited to use alone and may be employed along with other agents commonly introduced into producing oil wells for breaking emulsions, limiting scale formation, etc. It is further evident that my invention is not restricted to the use of improved compositions for inhibiting corrosion in oil wells but may be employed to perform this function in the presence of corrosive brines of other origin.

Having now described my invention, what is claimed is:

1. The method of protecting metal equipment which is subject to the corrosive action of oil well fluids which comprises adding to the fluids a minor quantity effective to substantially inhibit the corrosion of the metal equipment of a compound having the generic formula $$R-N\underset{\diagdown}{\overset{CH_2-CH_2}{\diagup}}\underset{C}{N}=\!\!\!=\!\!\!-Y-\!\!\!=\!\!\!=\underset{C}{N}\underset{\diagup}{\overset{CH_2-CH_2}{\diagdown}}N-R$$

in which one R is selected from the group consisting of (1)        $-CH_2CH_2-NH_2$ (2)        $-CH_2CH_2-NH-CH_2CH_2-NH_2$ (3)        $-CH_2CH_2-NH-CH_2CH_2-NH-CH_2CH_2NH_2$ (4)        $-CH_2CH_2-N\!\!=\!\!CHR'$ (5)

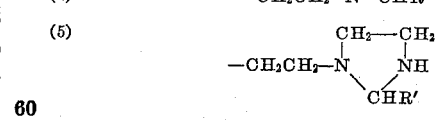

and (6)

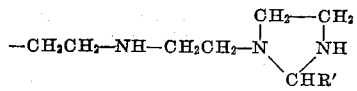

in which R' is selected from the group consisting of hydrogen atoms and hydrocarbon radicals, and the other R is selected from the group consisting of (4), (5), and (6), and Y is a hydrocarbon radical containing at least 2 carbon atoms, and thereafter causing the well fluids to come in contact with the metal to be protected.

2. The method according to claim 1 in which both R's are (6), R' is a hydrogen atom, and Y is a dimerized linoleic acid residue.

3. The method according to claim 1 in which both R's are (6), R' is —$C_6H_5$, and Y is a dimerized linoleic acid residue.

4. The method according to claim 1 in which one R is (2), the other R is (5), R' is —$C_6H_5$, and Y is a dimerized linoleic acid residue.

5. The method according to claim 1 in which both R's are (5), R' is —$C_6H_{13}$, and Y is —$C_2H_4$—.

6. The method according to claim 1 in which both R's are (4), R' is a hydrogen atom, and Y is a dimerized linoleic acid residue.

References Cited in the file of this patent

UNITED STATES PATENTS

| | | |
|---|---|---|
| 2,466,517 | Blair et al. | Apr. 5, 1949 |
| 2,468,163 | Blair et al. | Apr. 26, 1949 |
| 2,599,385 | Gross et al. | June 3, 1952 |
| 2,643,227 | Hughes et al. | June 23, 1953 |
| 2,643,977 | Hughes | June 30, 1953 |
| 2,643,978 | Hughes | June 30, 1953 |
| 2,646,399 | Hughes | July 21, 1953 |
| 2,646,400 | Hughes | July 21, 1953 |